US012680578B2

(12) United States Patent
Dötschel et al.

(10) Patent No.: US 12,680,578 B2
(45) Date of Patent: Jul. 14, 2026

(54) APPARATUS FOR TRANSMITTING TORQUE

(71) Applicant: ZF Friedrichshafen AG, Friedrichshafen (DE)

(72) Inventors: Philip Dötschel, Friedrichshafen (DE); Martin Brehmer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/967,301

(22) Filed: Dec. 3, 2024

(65) Prior Publication Data

US 2025/0180074 A1      Jun. 5, 2025

(30) Foreign Application Priority Data

Dec. 4, 2023      (DE) .......................... 102023212123.9

(51) Int. Cl.
| | |
|---|---|
| *F16D 1/108* | (2006.01) |
| *B60K 1/00* | (2006.01) |
| *F16H 48/10* | (2012.01) |
| *F16H 57/08* | (2006.01) |
| *F16D 1/10* | (2006.01) |

(52) U.S. Cl.
CPC ................ *F16D 1/108* (2013.01); *B60K 1/00* (2013.01); *F16H 48/10* (2013.01); *F16H 57/082* (2013.01); *B60K 2001/001* (2013.01); *F16D 2001/103* (2013.01); *F16H 2048/104* (2013.01); *F16H 2048/106* (2013.01)

(58) Field of Classification Search
CPC .... F16D 1/108; F16D 2001/103; F16D 1/116; F16H 48/10; F16H 2048/104; F16H 2048/106; B60K 2001/001; F16B 21/18
See application file for complete search history.

(56) References Cited

U.S. PATENT DOCUMENTS

| | | | | |
|---|---|---|---|---|
| 11,255,419 B2 * | 2/2022 | Lindtner | ................. | F16H 48/10 |
| 11,815,169 B2 * | 11/2023 | Reisch | .................... | F16H 48/10 |
| 11,846,346 B2 * | 12/2023 | Kölbl | ................... | B60K 17/165 |

(Continued)

FOREIGN PATENT DOCUMENTS

| | | |
|---|---|---|
| DE | 102015216975 A1 | 3/2017 |
| DE | 102016202533 A1 | 8/2017 |

(Continued)

OTHER PUBLICATIONS

DE-102022213926-A1 (Year: 2024).*

(Continued)

*Primary Examiner* — Derek D Knight
(74) *Attorney, Agent, or Firm* — Dority & Manning, P.A.

(57) ABSTRACT

An apparatus for transmitting torque includes a hub element and a shaft element. The hub element includes a hub engagement section (42) with a hub take-up profile which may be brought into engagement with a shaft engagement section (41) with a shaft take-up profile of the shaft element for transmitting torque. The hub element includes a hub connection section arranged offset in the axial direction towards a connection side relative to the hub engagement section (42). The shaft element includes a shaft connection section arranged offset in the axial direction towards the connection side relative to the shaft engagement section (41).

14 Claims, 3 Drawing Sheets

(56)                    References Cited

U.S. PATENT DOCUMENTS

| | | | | |
|---|---|---|---|---|
| 12,253,145 B2 * | 3/2025 | Dötschel | ............... | F16H 57/082 |
| 2013/0324354 A1 * | 12/2013 | Phebus | ..................... | F16H 1/46 |
| | | | | 475/331 |
| 2023/0243408 A1 * | 8/2023 | Kölbl | ...................... | F16H 48/22 |
| | | | | 475/150 |
| 2023/0265917 A1 * | 8/2023 | Brehmer | ................ | B60K 17/16 |
| | | | | 475/150 |
| 2024/0328497 A1 * | 10/2024 | Gyarmati | ............. | F16H 57/043 |

FOREIGN PATENT DOCUMENTS

| | | | | | |
|---|---|---|---|---|---|
| DE | 112018002557 T5 | 1/2020 | | | |
| DE | 102018007399 A1 | 3/2020 | | | |
| DE | 102022213921 A1 | 6/2024 | | | |
| DE | 102022213926 A1 * | 6/2024 | ........... | F16H 57/031 |
| WO | WO-2005120877 A1 * | 12/2005 | ............. | B60K 17/16 |

OTHER PUBLICATIONS

WO-2005120877-A1 (Year: 2005).*
German Search Report for Application No. 102023212123.9 Dated Jul. 19, 2024.

* cited by examiner

APPARATUS FOR TRANSMITTING TORQUE

CROSS-REFERENCE TO RELATED APPLICATION

The present application is related and has right of priority to German Patent Application No. DE102023212123.9 filed on Dec. 4, 2023, which is incorporated by reference in its entirety for all purposes.

TECHNICAL FIELD

The present invention relates generally to an apparatus for transmitting torque, a differential transmission with an apparatus for transmitting torque, and a vehicle with a differential transmission.

PRIOR ART

Take-up toothings for transmitting torque are known. In a take-up toothing, non-uniform wear and local failure of a take-up toothing profile may occur.

SUMMARY

Example aspects of the present invention provide an improved apparatus for transmitting torque, with which a long service life and a high load-bearing capacity are achieved.

An apparatus for transmitting torque includes a hub element and a shaft element. The hub element includes a hub engagement section with a hub take-up profile which may be brought into engagement with a shaft engagement section with a shaft take-up profile for transmitting torque. The hub engagement section may include the hub take-up profile at an inner circumference. The shaft engagement section may include the shaft take-up profile at an outer circumference. The hub element includes a hub connection section which is arranged offset in an axial direction towards a connection side relative to the hub engagement section. The hub engagement section of the hub element may be arranged offset in a radial direction, for example inwardly, relative to the hub connection section.

The shaft element includes a shaft connection section which is arranged offset in the axial direction towards the connection side relative to the shaft engagement section. The shaft element may be torque-proofly connectable to the hub element via the engagement of the shaft engagement section with the hub engagement section.

A torque-proof connection of two elements is understood to mean a connection in which the two elements are rigidly coupled to each other for all intended states of the transmission, so that the two elements have substantially the same rotational speed. The elements may be present here as individual components connected in a torque-proof manner to each other or else in one piece. A torque-proof connection may include a spline profile. The spline profile may be configured, for example, as a splined shaft, toothed shaft or notched profile. An axial securing mechanism, for example a securing ring, snap ring or spiral ring, may be provided for limiting a relative movement in the axial direction. The torque-proof connection may be configured as a press connection or by screw connections of flanges of the elements.

The hub element and the shaft element may be rotatable about a common axis of rotation. The shaft take-up profile and the hub take-up profile may be configured for transmitting torque. The torque may be transmitted by a circumferential force in a circumferential direction and a distance from the axis of rotation. The distance of the circumferential force from the axis of rotation may be formed by a diameter of the shaft take-up profile or of the hub take-up profile. The shaft take-up profile and the hub take-up profile may each be configured as a spline or as a polygon profile. The shaft take-up profile and the hub take-up profile may each extend in the axial direction. The shaft take-up profile and the hub take-up profile may each extend in a spiral shape.

The connection sides of the shaft element and of the hub element may be configured for receiving or outputting torque. The hub connection section may be configured for receiving torque. For example, the hub connection section may include receptacles for bolts. The hub element may be driven from outside the apparatus. The shaft connection section may be configured for outputting torque. The shaft connection section may be configured for connection to a wheel hub of a drive wheel of a vehicle.

The hub element may be hollow. The shaft element may be cylindrical. The shaft element may extend through the hub element. The shaft engagement section may be arranged within the hub engagement section in the radial direction. The shaft element may include the shaft engagement section at one end in the axial direction on the engagement side. The hub connection section may be torque-proofly connected to the hub engagement section. The torque-proof connection may be configured for an advantageous introduction of force. The torque-proof connection may be configured such that an advantageous force distribution profile is established in the axial direction between the shaft take-up profile and the hub take-up profile.

In an example embodiment, the hub element may be displaceable in the axial direction relative to the shaft element.

In an example embodiment, the hub engagement section and the shaft engagement section may be configured for a uniform force distribution in the axial direction between the hub take-up profile and the shaft take-up profile. A uniform force distribution may include a circumferential force between the hub take-up profile and the shaft take-up profile that is substantially constant section-wise in the axial direction. A uniform force distribution may include a circumferential force between the hub take-up profile and the shaft take-up profile that is adapted in the axial direction to load-bearing capacities of the hub take-up profile and of the shaft take-up profile that are different in certain areas.

In an example embodiment, the hub element may include an offset section which extends in the axial direction from the hub connection section towards an engagement side opposite the connection side. The offset section may be torque-proofly connected to an area of the hub engagement section.

The offset section may be configured in one piece with the connection section of the hub element. The offset section may be connected to an outer circumference of the hub engagement section. The offset section may extend in the axial direction. The offset section may extend from the connection section in the axial direction towards the engagement side. The offset section may be hollow. The offset section may be tubular. The offset section may be cylindrical. The offset section may include a radial section at an end section on the engagement side, which extends inwardly in a radial direction. The radial section may be toque-proofly connected to the hub engagement section.

The offset section may be arranged outside the hub engagement section in the radial direction. The offset section may overlap the hub engagement section in the axial direction. The offset section may extend in the axial direction in an area of the hub engagement section. A relief groove may be provided between the hub engagement section and the offset section. The relief groove may be formed as a gap. The gap may be formed by an inner circumference of the offset section. The gap may be formed by an outer circumference of the hub engagement section. The gap may be annular. The gap may extend from the radial section towards the connection side in the axial direction. The gap may be formed by cutting. The gap may be manufactured by eroding. The gap may be forged. A force transmission from the offset section to the hub engagement section in the area of the gap may be prevented via the gap. A force flow may thus be diverted.

An introduction of force into the hub engagement section may be advantageously formed via the position of the connection of the offset section to the hub engagement section in the axial direction. The connection may be positioned at an end area of the hub engagement section on the engagement side. The connection may be positioned in the axial direction in a central area of the hub engagement section. The connection may be positioned in the axial direction in an area between the central area and the end area on the engagement side of the hub engagement section.

In an example embodiment, the offset section may be connected to an area of the hub engagement section which is central in the axial direction. The central area may include the geometric center of the hub engagement section in the axial direction. The central area may extend from a first third of the extension of the hub engagement section in the axial direction to a second third of the extension of the hub engagement section in the axial direction. As a result, the torque may be introduced close to the center or through the geometric center in the axial direction of the hub engagement element and the shaft engagement element. This is advantageous for the force flow through the shaft take-up profile and the hub take-up profile. As a result, the shaft take-up profile and the hub take-up profile may be loaded to a larger extent. A diameter in the radial direction of the shaft take-up profile and the hub take-up profile may be reduced. As a result, a diameter of the shaft element as a whole may be reduced.

In an example embodiment, the offset section may be connected to an end area of the hub engagement section, which is arranged on the engagement side in the axial direction. The end area may extend from the central area to the end of the hub engagement section on the engagement side. The end area may extend within the last third of the extension of the hub engagement section in the axial direction on the engagement side. As a result, the torque may be introduced close to the center into an area on the engagement side of the hub engagement section in the axial direction of the hub engagement element and the shaft engagement element. This is advantageous for the force flow through the shaft take-up profile and the hub take-up profile.

In an example embodiment, the offset section and the hub engagement section may be configured in two parts. The offset section may be torque-proofly connected to the hub engagement section by welding. The gap may then be configured to be thin in the radial direction, for example thinner than in the case of a gap produced by forging. The hub engagement section may include a positioning section, which extends in the axial direction, on which the offset section may be positioned in the radial direction. The positioning section may be cylindrical. The hub engagement section may include a contact section, which extends in the radial direction and at which the offset section may be positioned in the axial direction.

In an example embodiment, the offset section may be configured in one piece with the hub engagement section and the connection section. The hub element may be produced by forging.

In an example embodiment, the apparatus may include an axial securing mechanism which is arranged on the engagement side in the axial direction relative to the offset section and positions the shaft element in the axial direction relative to the hub element. The axial securing mechanism may be configured as a bearing, as an axial stop, as a securing ring or as a snap ring. With the axial securing mechanism, a movement of the shaft element and of the hub element relative to each other may be restrictable. The axial securing mechanism may be fitted into a groove extending in the circumferential direction in the shaft element. The axial securing mechanism may be fitted into a groove extending in the circumferential direction in the hub element. A groove may be arranged in an area of the shaft take-up profile. A groove may be arranged in an area of the hub take-up profile. A groove may be arranged on the engagement side in the axial direction between the connection of the offset section to the hub engagement section and an end area of the hub engagement section in the axial direction. The axial securing mechanism may be arranged at an end area of the hub engagement section on the engagement side. The axial securing mechanism may be positioned on the engagement side in the axial direction directly before the connection of the offset section to the hub engagement section.

In an example embodiment, the hub element may be formed by a first planet carrier for a first planet gear set. The apparatus for transmitting torque may be usable for a differential transmission with the first planet gear set. The hub connection section may be configured for receiving first planet bolts of the first planet gear set. The hub connection section may include cylindrical bores. The hub connection section may include a plurality of receptacles distributed in the circumferential direction. The receptacles may be uniformly distributed in the circumferential direction.

In one example aspect, a differential transmission includes an input element, a first gear set, a second gear set, a first output shaft, a second output shaft and an apparatus for transmitting torque according to one of the preceding example embodiments. The input element is mechanically operatively connected to the first gear set for the transmission of a torque. The first gear set is mechanically operatively connected to the second gear set for the transmission of a torque. The first gear set is mechanically operatively connected to the first output shaft for the output of a torque. The second gear set is mechanically operatively connected to the second output shaft for the output of a torque. The first output shaft forms the shaft element of the apparatus for transmitting torque.

The second output shaft may be rotatably supported at a stationary component via a bearing. The bearing of the second output shaft may be configured as a needle bearing or grooved ball bearing. The bearing of the second output shaft and the hub engagement section may be arranged in the same plane in the axial direction. The bearing of the second output shaft may be arranged outside the hub engagement section in the radial direction.

The bearing of the second output shaft may be arranged offset in the axial direction relative to the hub engagement section. The bearing of the second output shaft may overlap the hub engagement section in the radial direction.

In an example embodiment, the first gear set may be formed by a first planet gear set. The second gear set may be formed by a second planet gear set. A first planet carrier of the first planet gear set may form the hub element. The shaft engagement section and the hub engagement section may be arranged on the engagement side in the axial direction relative to the first planet gear set.

The first planet gear set may include a first sun gear, the first planet carrier, a first planet bolt, a first planet gear, and a first ring gear. The first sun gear may be in engagement with the first planet gear. The first planet gear may be in engagement with the first ring gear. The first planet gear may be rotatably mounted on the first planet bolt. The first planet bolt may be connected to the first planet carrier.

The second planet gear set may include a second sun gear, a second planet carrier, a second planet bolt, a second planet gear, and a second ring gear. The second sun gear may be in engagement with the second planet gear. The second planet gear may be in engagement with the second ring gear. The second planet gear may be rotatably mounted on the second planet bolt. The second planet bolt may be connected to the second planet carrier.

The example embodiment of the forged first planet carrier may be used in a differential transmission in which the first planet gear set and the second planet gear set are arranged offset in the axial direction relative to each other.

In an example embodiment, the input element may be torque-proofly connected to a first sun gear of the first planet gear set. The first planet carrier may be torque-proofly connected to the first output shaft for the output of a torque from the first planet gear set. The second ring gear of the second planet gear set may be torque-proofly connected to the second output shaft for the output of a torque from the second planet gear set.

The input element may form the first sun gear at an outer circumference. The first ring gear may be torque-proofly connected to the second sun gear. The first ring gear may be torque-proofly connected to the second sun gear via a coupling element. The second planet carrier may be torque-proofly connected to a stationary component. The stationary component may be formed by a transmission housing.

The first output shaft and the second output shaft may be arranged coaxially to the input element. The first output shaft may extend in the axial direction through the input element. The first output shaft may extend at least partially or in sections in the axial direction within the second output shaft. The first output shaft may be rotatably supported in the second output shaft.

An outer diameter of the shaft engagement section may be smaller in the radial direction than an inner diameter of a passage through the input element.

The offset section may be arranged at least partially or in sections within the second output shaft in the axial direction. The shaft engagement section and the hub engagement section may be arranged partially or in sections in the second output shaft in the axial direction. The second output shaft may be hollow partially or in sections.

With an apparatus for transmitting torque according to one of the preceding example embodiments, an outer diameter of the shaft engagement section may be small. As a result, the first sun gear may be configured with a smaller outer diameter. As a result, a stationary transmission ratio of the differential transmission may be increased.

In an example embodiment, the first planet gear set and the second planet gear set may be arranged in a stacked manner. A sun ring gear may form the first ring gear at an inner circumference and the second sun gear at an outer circumference. The first planet gear set and the second planet gear set may be arranged in the same plane in the axial direction. The second planet gear set may be arranged outside the first planet gear set in the radial direction.

In one example aspect, a vehicle includes a drive unit, at least two drive wheels and a differential transmission according to one of the preceding example embodiments and aspects. The drive unit is configured for driving the input element. One of the drive wheels is configured for driving the vehicle via the first output shaft. The other of the drive wheels is configured for driving the vehicle via the second output shaft.

DETAILED DESCRIPTION

Figure 1:
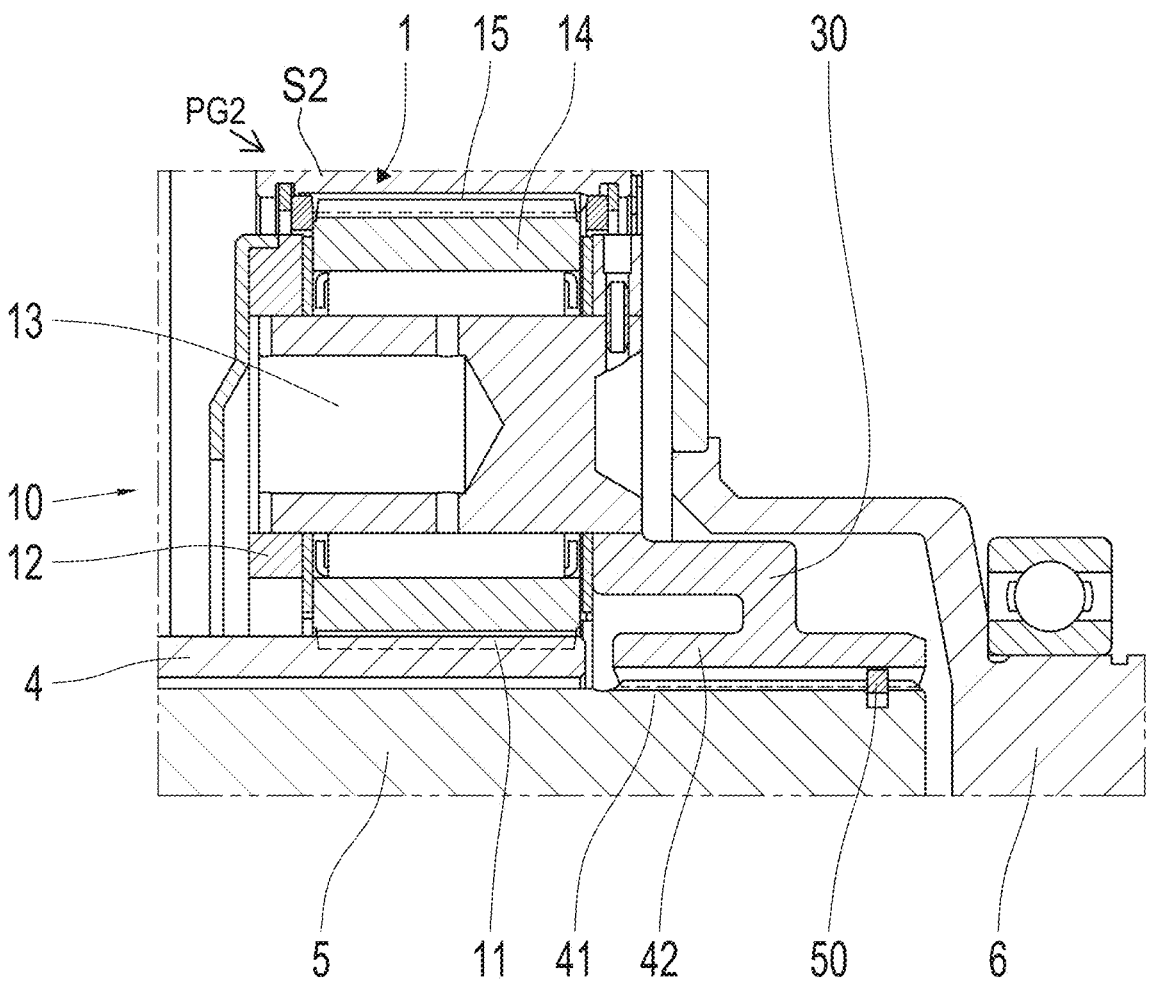
FIG. 1 shows a sectional view of an example embodiment of a differential transmission with an apparatus for transmitting torque.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of an example embodiment of a differential transmission with an apparatus for transmitting torque. The differential transmission includes a drive unit D1, the drive unit D1 configured for driving an input element 4, a first gear set, in the present case a first planet gear set 10, a second gear set, in the present case a second planet gear set PG2, a first output shaft 5 and a second output shaft 6. The differential transmission is configured for dividing torque from the input element 4 to the first output shaft 5 and the second output shaft 6. The apparatus for transmitting torque includes a hub element and a shaft element. The hub element is formed by a first planet carrier 12 of the first planet gear set 10. The shaft element is formed by the first output shaft 5.

The first planet carrier 12 is torque-proofly connected to a shaft engagement section 41 of the first output shaft 5 via a hub engagement section 42 for the output of a torque from the first planet gear set 10. The hub engagement section 42 and the shaft engagement section 41 are configured for an advantageous force distribution in the axial direction between the hub take-up profile and the shaft take-up profile.

Further details of the transmission and of the apparatus for transmitting torque are described below.

The first planet gear set 10 includes a first sun gear 11, a first planet carrier 12, a number of first planet bolts 13, a number of first planet gears 14, and a first ring gear 15. The first sun gear 11 is in engagement with one of the first planet gears 14. One of the first planet gears 14 is in engagement with the first ring gear 15 and is rotatably mounted on one of the first planet bolts 13. The first planet bolts 13 are connected to the first planet carrier 12.

Figure 3:
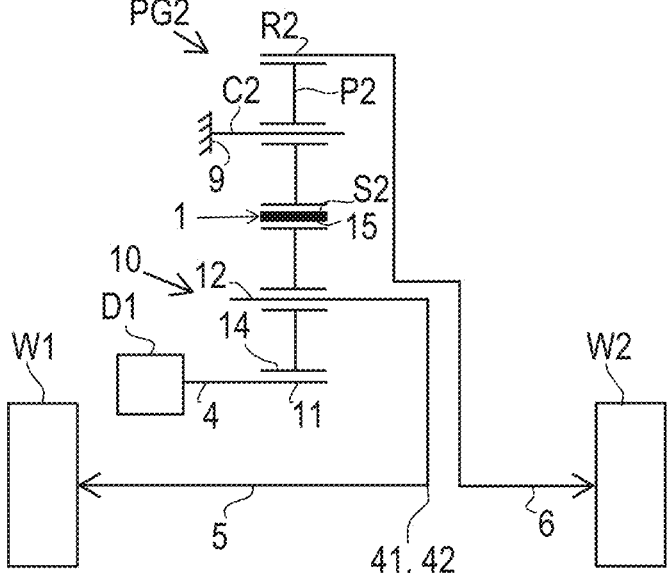
FIG. 3 shows a schematic plan of a differential transmission according to FIGS. 1 and 2.

The second planet gear set PG2 is partially shown in FIG. 1. As shown schematically in FIG. 3, the second planet gear set PG2 includes a second sun gear S2, a second planet carrier C2, a number of second planet bolts, a number of second planet gears P2, and a second ring gear R2. The second sun gear S2 is in engagement with one of the second planet gears P2. One of the second planet gears P2 is in engagement with the second ring gear R2 and is rotatably mounted on one of the second planet bolts. The second planet bolts P2 are connected to the second planet carrier C2. The second planet carrier C2 is formed by a stationary component 9.

The first planet gear set 10 and the second planet gear set PG2 are arranged in the same plane in the axial direction. The second planet gear set PG2 is arranged outside the first planet gear set 10 in the radial direction.

The first ring gear 15 and the second sun gear S2 are torque-proofly to each other by a coupling element 1. In the present case, the coupling element 1 is formed by a sun ring gear. The sun ring gear 1 includes the first ring gear 15 at an inner circumference. The sun ring gear 1 includes the second sun gear S2 at an outer circumference. As a result, the first planet gear set 10 is mechanically operatively connected to the second planet gear set PG2.

The input element 4 forms the first sun gear 11 of the first planet gear set 10 on an outer circumference of an end section of the input element 4 on an engagement side, the right-hand side in FIG. 1. The second ring gear R2 of the second planet gear set PG2 is connected in a rotationally fixed manner to the second output shaft 6 in FIG. 2 for the output of a torque from the second planet gear set PG2.

The first output shaft 5 and the second output shaft 6 are arranged coaxially to the input element 4. The first output shaft 5 extends in the axial direction through the input element 4. The first output shaft 5 extends in sections in the axial direction within the second output shaft 6. The second output shaft 6 is rotatably mounted to a stationary component, in the present case a transmission housing, via a bearing, in the present case a grooved ball bearing (FIG. 1).

The first output shaft 5 includes a shaft connection section, which is arranged, relative to the shaft engagement section 41, offset in the axial direction towards a connection side, the left side in FIG. 1. The shaft connection section serves for the output of a torque from the first output shaft 5 for driving a drive wheel W1 (FIG. 3) of a vehicle not shown in FIG. 1. The other of the drive wheels W2 (FIG. 3) is configured for driving the vehicle via the second output shaft 6. The first output shaft 5 includes the shaft engagement section 41 with a shaft take-up profile, in the present case a spline, on an outer circumference. The shaft engagement section 41 is arranged at an end section of the first output shaft 5 on the engagement side.

The first planet carrier 12 includes the hub engagement section 42 with a hub take-up profile, in the present case a spline, at an inner circumference. In this respect, the first output shaft 5 and the first planet carrier 12 together form a take-up toothing. The hub engagement section 42 is arranged offset in the axial direction relative to the bearing of the second output shaft 6. The first planet carrier 12 includes a hub connection section which is arranged offset in the axial direction towards the connection side relative to the hub engagement section 42. In the present case, the hub connection section is formed by receptacles of the first planet carrier 12 for the first planet bolts 13. The hub connection section serves for the introduction of a torque from the first planet gear set 10 into the first planet carrier 12.

The take-up toothing is arranged offset in the axial direction towards the engagement side relative to the hub connection section. The first planet carrier 12 includes an offset section 30. The offset section 30 extends from the hub connection section in the axial direction towards the engagement side. The offset section 30 includes a radial section at one end on the engagement side, which extends inwardly in a radial direction of the first output shaft 5. As a result, an annular gap is formed between the hub engagement section 42 and the offset section 30, which is arranged on the connection side relative to the radial section. The annular gap extends in the radial direction at a height, which is comparable to a height of the hub engagement section 42 in the radial direction.

The radial section is torque-proofly connected to a central area of the hub engagement section 42. At the same time, the hub engagement section 42 extends from the radial section approximately equally far towards the connection side and towards the engagement side in the axial direction. In the present case, the offset section 30 is configured in one piece with the hub engagement section 42 and the connection section. The first planet carrier 12 is produced by forging.

As a result of the configuration of the first planet carrier 12 with the offset section 30 and its connection to the hub engagement section 42, a torque to be transmitted is introduced close to the center into the take-up toothing. This is favorable for a force flow through the take-up toothing. As a result, the take-up toothing may be heavily loaded.

The first planet carrier 12 is displaceable in the axial direction relative to the first output shaft 5 via the take-up toothing. The apparatus therefore includes an axial securing mechanism 50 which is arranged on an engagement side in the axial direction relative to the offset section 30. The axial securing mechanism 50 is configured as a securing ring and positions the first output shaft 5 in the axial direction relative to the first planet carrier 12. The securing ring is fitted into a groove extending in a circumferential direction of the first output shaft 5 at an outer circumference. The securing ring is fitted into a groove extending in the circumferential direction of the first planet carrier 12 at an inner circumference. The securing ring is arranged at an end area of the take-up toothing on the engagement side.

Figure 2:
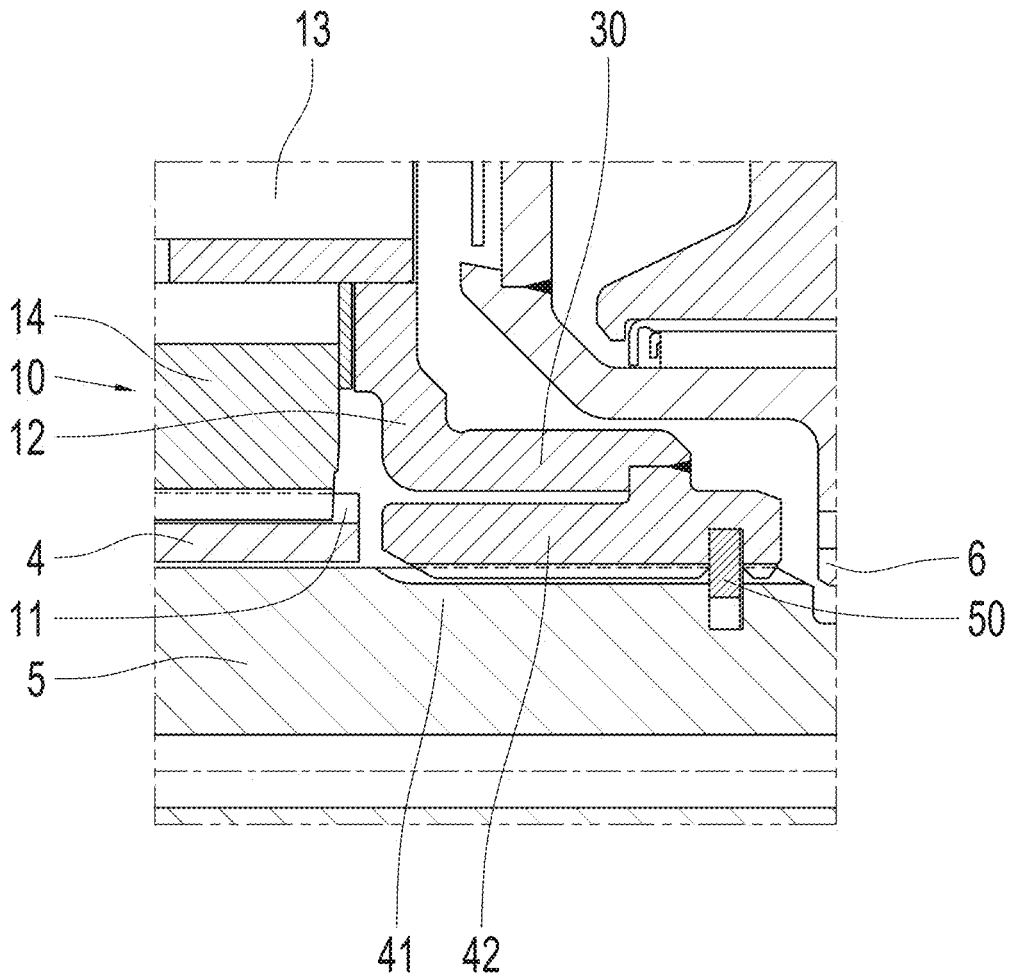
FIG. 2 shows a sectional view of another example embodiment of a differential transmission with an apparatus for transmitting torque.

FIG. 2 shows a sectional view of another example embodiment of a differential transmission with an apparatus for transmitting torque. The present example embodiment differs from the preceding example embodiment in that the first planet carrier 12, the first output shaft 5 and the second output shaft 6 are different.

In the present case, the first planet carrier 12 is configured in two parts. The hub engagement section 42 is configured separately from the offset section 30. The offset section 30 is welded to the hub engagement section 42 at a connecting projection which extends in the radial direction. The connecting projection is provided instead of the radial section of the preceding example embodiment. The hub engagement section 42 is configured within the bearing of the second output shaft 6 in the radial direction. The hub engagement section 42 and the bearing of the second output shaft 6 are arranged in the same plane in the axial direction. The bearing of the second output shaft 6 is configured as a needle bearing.

The gap between the hub engagement section 42 and the offset section 30 is configured to be significantly thinner in the radial direction than in the preceding embodiment. The axial securing mechanism 50 is arranged at the engagement side directly from the connecting projection in the axial direction.

The offset section 30 is connected to an end area of the hub engagement section 42 which is arranged on the engagement side in the axial direction. Accordingly, the hub engagement section 42 extends from the connecting projection further towards the connection side than towards the engagement side. As a result, the torque to be transmitted is introduced further away from an end section of the take-up toothing, which is arranged on the connection side. As a result, a force flow through the take-up toothing may be distributed in a wide area in the axial direction from the connecting projection to the end area on the engagement side. This is advantageous for the force flow through the take-up toothing. As a result, the take-up toothing may be heavily loaded.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 coupling element
4 input element
5 first output shaft
6 second output shaft
10 first planet gear set
11 first sun gear
12 first planet carrier
13 first planet bolt
14 first planet gear
15 first ring gear
30 offset section
41 shaft engagement section
42 hub engagement section
50 axial securing mechanism

The invention claimed is:

1. An apparatus for transmitting torque, comprising:
a hub element comprising a hub engagement section (42) with a hub take-up profile and also comprises a hub connection section; and
a shaft element comprising a shaft engagement section (41) with a shaft take-up profile and also comprises a shaft connection section,
wherein the hub engagement section (42) with the hub take-up profile is configured to be brought into engagement with the shaft engagement section (41) with the shaft take-up profile of the shaft element for transmitting torque,
wherein the hub connection section is configured for receiving torque and is arranged offset in an axial direction towards a connection side relative to the hub engagement section (42) such that the hub engagement section (42) extends in the axial direction at least partially towards an engagement side opposite the connection side relative to an end of the hub connection section, the end of the hub connection section being on the engagement side and directly connected to an offset section (30) comprising a radial section extending inwardly in a radial direction to the hub engagement section (42), wherein the shaft connection section is configured for outputting torque and is arranged offset in the axial direction towards the connection side relative to the shaft engagement section (41), and
wherein the hub engagement section (42) and the shaft engagement section (41) are configured for a uniform force distribution in the axial direction between the hub take-up profile and the shaft take-up profile.

2. The apparatus of claim 1, wherein the hub element is displaceable in the axial direction relative to the shaft element.

3. The apparatus of claim 1, wherein the hub element comprises an offset section (30) that extends in the axial direction from the hub connection section towards the engagement side and is torque-proofly connected to an area of the hub engagement section (42).

4. The apparatus of claim 3, wherein the offset section (30) is connected to a central area of the hub engagement section (42) in the axial direction.

5. The apparatus of claim 3, wherein the offset section (30) is connected to an end area of the hub engagement section (42) arranged on the engagement side in the axial direction.

6. The apparatus of claim 3, wherein the offset section (30) and the hub engagement section (42) are configured in two parts, and the offset section (30) is torque-proofly connected to the hub engagement section (42) by welding.

7. The apparatus of claim 3, wherein the offset section (30) is configured as one piece with the hub engagement section (42) and the connection section.

8. The apparatus of claim 3, further comprising an axial securing mechanism (50) arranged on the engagement side in the axial direction relative to the offset section (30), the axial securing mechanism (50) positioning the shaft element relative to the hub element in the axial direction.

9. The apparatus of claim 3, wherein the hub element is formed by a first planet carrier (12) of a first planet gear set (10).

10. A differential transmission, comprising:
an input element (4);
a first gear set;
a second gear set;
a first output shaft (5);
a second output shaft (6); and
the apparatus of claim 1,
wherein the input element (4) is mechanically operatively connected to the first gear set for torque transmission,
wherein the first gear set is mechanically operatively connected to the second gear set for torque transmission,
wherein the first gear set is mechanically operatively connected to the first output shaft (5) for torque output,
wherein the second gear set is mechanically operatively connected to the second output shaft (6) for torque output, and
wherein the first output shaft (5) forms the shaft element of the apparatus.

11. The differential transmission of claim 10, wherein:
the first gear set is formed by a first planet gear set (10);
the second gear set is formed by a second planet gear set; and
a first planet carrier (12) of the first planet gear set (10) forms the hub element.

12. The differential transmission of claim 11, wherein:
the input element (4) is torque-proofly connected to a first sun gear (11) of the first planet gear set (10);

the first planet carrier (12) is torque-proofly connected to the first output shaft (5) for torque output from the first planet gear set (10); and a second ring gear of the second planet gear set is torque-proofly connected to the second output shaft (6) for torque output from the second planet gear set.

13. The differential transmission of claim 11, wherein the first planet gear set (10) and the second planet gear set are stacked together.

14. A vehicle, comprising:

a drive unit;

two drive wheels; and the differential transmission of claim 10, wherein the drive unit is configured for driving the input element (4), wherein one of the two drive wheels is configured for driving the vehicle via the first output shaft (5), and wherein the other of the two drive wheels is configured for driving the vehicle via the second output shaft (6).

\*   \*   \*   \*   \*